United States Patent
Kim et al.

(10) Patent No.: US 9,793,751 B2
(45) Date of Patent: Oct. 17, 2017

(54) ENERGY HARVESTING APPARATUS AND METHOD FOR RAPIDLY TRACKING A MAXIMUM POWER POINT

(71) Applicant: KOREA UNIVERSITY RESEARCH AND BUSINESS FOUNDATION, Seoul (KR)

(72) Inventors: Chul Woo Kim, Seoul (KR); Min Seob Shim, Seoul (KR); Jun Won Jung, Seoul (KR); Jung Moon Kim, Seoul (KR)

(73) Assignee: Korea University Research and Business Foundation, Seoul (KR)

( * ) Notice: Subject to any disclaimer, the term of this patent is extended or adjusted under 35 U.S.C. 154(b) by 308 days.

(21) Appl. No.: 14/591,786

(22) Filed: Jan. 7, 2015

(65) Prior Publication Data

US 2016/0079791 A1  Mar. 17, 2016

(30) Foreign Application Priority Data

Sep. 15, 2014  (KR) .................. 10-2014-0122305

(51) Int. Cl.
   *H02J 7/34* (2006.01)
(52) U.S. Cl.
   CPC .................. *H02J 7/345* (2013.01)
(58) Field of Classification Search
   CPC .................................................. H02J 7/345
   USPC ........................................................ 320/166
   See application file for complete search history.

(56) References Cited

U.S. PATENT DOCUMENTS

| | | | | |
|---|---|---|---|---|
| 2009/0209303 | A1* | 8/2009 | Kroll | H04M 1/05 455/575.2 |
| 2010/0270996 | A1* | 10/2010 | Ramadas | H02M 1/36 323/311 |
| 2014/0191730 | A1* | 7/2014 | Ivanov | H02M 7/219 320/145 |
| 2014/0211523 | A1 | 7/2014 | Mateu Saez et al. | |

FOREIGN PATENT DOCUMENTS

JP  2013-523080 A  6/2013

OTHER PUBLICATIONS

Minseob Shim et al. "Self-Powered 30uW-to10mW Piezoelectric Energy-Harvesting System with 9.09ms/V Maximum Power Point Tracking Time" 2014 IEEE International Solid-State Circuits Conference (Feb. 9, 2014).

* cited by examiner

*Primary Examiner* — Richard Isla Rodas
*Assistant Examiner* — Manuel Hernandez
(74) *Attorney, Agent, or Firm* — Novick, Kim & Lee, PLLC; Sang Ho Lee

(57) ABSTRACT

Disclosed is an energy harvesting apparatus. The energy harvesting apparatus includes a rectifier for rectifying an alternating current (AC) voltage supplied from an energy source into a direct current (DC) voltage, a charging unit for storing an output voltage of the rectifier, and a maximum power point tracker selectively connected between the rectifier and the charging unit, for differentiating the output voltage of the rectifier in a first connection state, and for controlling the output voltage of the rectifier based on a differentiation result.

3 Claims, 9 Drawing Sheets

(a)

(b)

(a)

(b)

(a)

| Parameters | ISSCC 2013 [3] | TPEL 2012 [4] | This work |
|---|---|---|---|
| Process | 0.25μm BCD | Off-chip | 0.35μm BCD |
| Input voltage | 5-60V | 3-25V | 1-7V |
| Output voltage | 2-5V | 3V~ | 1-8V |
| Input power | 25μW~1.6mW | N.A | 33μW~10mW |
| Type of converter | Buck | Buck-Boost | Buck-Boost |
| Maximum converter efficiency | 88.9% | 76% | 80% |
| MPPT algorithm | Variable Step-size P&O | P&O | Fractional V |
| Maximum MPPT efficiency | 99.9% | 97&% | 99.9% |
| MPPT Time | 800ms(21.5V to 11.5V) | 47s(17V to 11V) | 20ms(3.4V to 1.2V) |

(b)

ENERGY HARVESTING APPARATUS AND METHOD FOR RAPIDLY TRACKING A MAXIMUM POWER POINT

STATEMENT REGARDING PRIOR DISCLOSURES

A prior disclosure was made by joint inventors on Feb. 9, 2014, in a printed publication, which does not qualify as prior art under AIA 35 U.S.C. 102(b)(1)(A). A copy of the disclosure publication is submitted herewith in an Information Disclosure Statement.

CROSS-REFERENCE TO RELATED PATENT APPLICATION

This application claims the benefit of Korean Patent Application No. 10-2014-0122305, filed on Sep. 15, 2014, in the Korean Intellectual Property Office, the disclosure of which is incorporated herein in its entirety by reference.

BACKGROUND OF THE INVENTION

1. Field of the Invention

The present invention relates to an energy harvesting apparatus and method, and more particularly, to an energy harvesting apparatus and method for rapidly tracking a maximum power point of a device for converting vibration energy into power or a piezoelectric device.

2. Description of the Related Art

Low-carbon green growth is policy keynote of major developed countries. As one of methods for realization of this, low-power or non-power semiconductor design has become a big issue. Energy harvesting technology has draw attention as a very important factor for the low-power or non-power semiconductor design and the utility of energy harvesting technology has also remarkably increased by virtue of the development of various device technologies for converting energy such as light, vibration, heat, etc. into electrical energy. In addition, due to introduction of various mobile devices and wireless sensor nodes, users' requirements for energy harvesting technology have been on rise. It is necessary to effectively transfer energy harvested via the energy harvesting technology and to simultaneously lower power of a device for controlling the effective energy transfer.

In general, an energy harvesting circuit includes a harvester for producing power, a rectifier for converting generated energy into a direct current (DC) component, and a charging circuit for storing energy output from the rectifier in a battery or a high capacitance of capacitor. The harvester includes a piezoelectric device or a device for converting vibration energy into power. The device has a maximum power point that is determined according to an input amplitude and frequency.

Accordingly, in order to increase energy harvesting efficiency of the energy harvesting circuit, it is necessary to match a voltage and current between an output terminal of the rectifier and an input terminal of the charging circuit to the maximum power point. In this case, the maximum power point corresponds to a time point when half of an open circuit voltage is reached.

Conventionally, in order to find the maximum power point, a method (e.g. a Perturb & observe method, a Hill-climbing method, or the like) for tracking the maximum power point along with slight change in a voltage and current between an output terminal of a rectifier and an input terminal of a charging circuit or a method for tracking the maximum power point by opening a switch disposed between the output terminal of the rectifier and the input terminal of the charging circuit and then measuring an open voltage generated from the output terminal of the rectifier is mainly used.

In this conventional method, time corresponding to several tens to several hundreds of periods is taken to track the maximum power point. Accordingly, conventionally, power loss occurs during tracking of the maximum power point and there is a limit to apply the conventional method to an energy harvesting system with high variability of power harvested by a harvester.

SUMMARY OF THE INVENTION

The present invention provides an energy harvesting apparatus and method, for measuring an open-circuit voltage without additionally applying an external voltage and rapidly measuring a voltage value corresponding to a maximum power point using the open-circuit voltage.

The present invention provides an energy harvesting apparatus and method, for minimizing power loss.

The present invention provides an energy harvesting apparatus and method that may be applied to an energy harvesting system with high variability of power harvested by a harvester.

In addition, the present invention provides an energy harvesting apparatus and method having high conversion efficiency while rapidly handling an external environment.

According to an aspect of the present invention, there is provided an energy harvesting apparatus including a rectifier for rectifying an alternating current (AC) voltage supplied from an energy source into a direct current (DC) voltage, a charging unit for storing an output voltage of the rectifier, and a maximum power point tracker selectively connected between the rectifier and the charging unit, for differentiating the output voltage of the rectifier in a first connection state, and for controlling the output voltage of the rectifier based on a differentiation result.

The maximum power point tracker may include a first capacitor connected to an output node of the rectifier, a voltage controller selectively connected to the first capacitor, for differentiating a voltage of the first capacitor, for detecting a maximum power point based on a differentiation result, and for outputting a control signal corresponding to a detection result, and a charge sharer for storing a voltage of the output node of the rectifier based on the control signal and distributing the stored voltage as a maximum power point voltage.

The voltage controller may include a peak detector for differentiating the voltage of the first capacitor and outputting a differentiation result, and a control signal generator for generating the control signal based on an output signal of the peak detector.

The energy harvesting apparatus may further include a charging controller for comparing the output voltage of the rectifier and the maximum power point voltage and controlling an operation of the charging unit based on a comparison result.

The energy harvesting apparatus may further include a voltage multiplexer (MUX) for supplying power to the charging controller, wherein the voltage multiplexer (MUX) may include an S-R latch and a rising edge detector and prevents delay of output of the voltage multiplexer (MUX).

According to another aspect of the present invention, there is provided an energy harvesting method including rectifying an alternating current (AC) voltage supplied from an energy source into a direct current (DC) voltage, differentiating the rectified voltage and tracking a maximum power point of the rectified voltage based on a differentiation result, and charging with the rectified voltage while maintaining the rectified voltage when the rectified voltage reaches the maximum power point.

The differentiating and the tracking may include charging a first capacitor with the rectified voltage, differentiating a voltage of the first capacitor and detecting a maximum power point voltage based on a differentiation result, and distributing the voltage charged in the first capacitor to second and third capacitors when the maximum power point is detected.

The differentiating of the voltage of the first capacitor may include differentiating the voltage of the first capacitor, comparing the differentiation result with a bias voltage, and detecting the voltage of the first capacitor as the maximum power point voltage at a time point when the differentiation result becomes smaller than the bias voltage The charging may include comparing the rectified voltage with the maximum power point voltage, enhancing the rectified voltage by temporarily stopping charging when the rectified voltage is lower than the maximum power point voltage as a comparison result, and lowering the rectified voltage by continuously performing charging when the rectified voltage is higher than the maximum power point voltage as the comparison result.

BRIEF DESCRIPTION OF THE DRAWINGS

The above and other features and advantages of the present invention will become more apparent by describing in detail exemplary embodiments thereof with reference to the attached drawings in which.

DETAILED DESCRIPTION OF THE INVENTION

Figure 1:
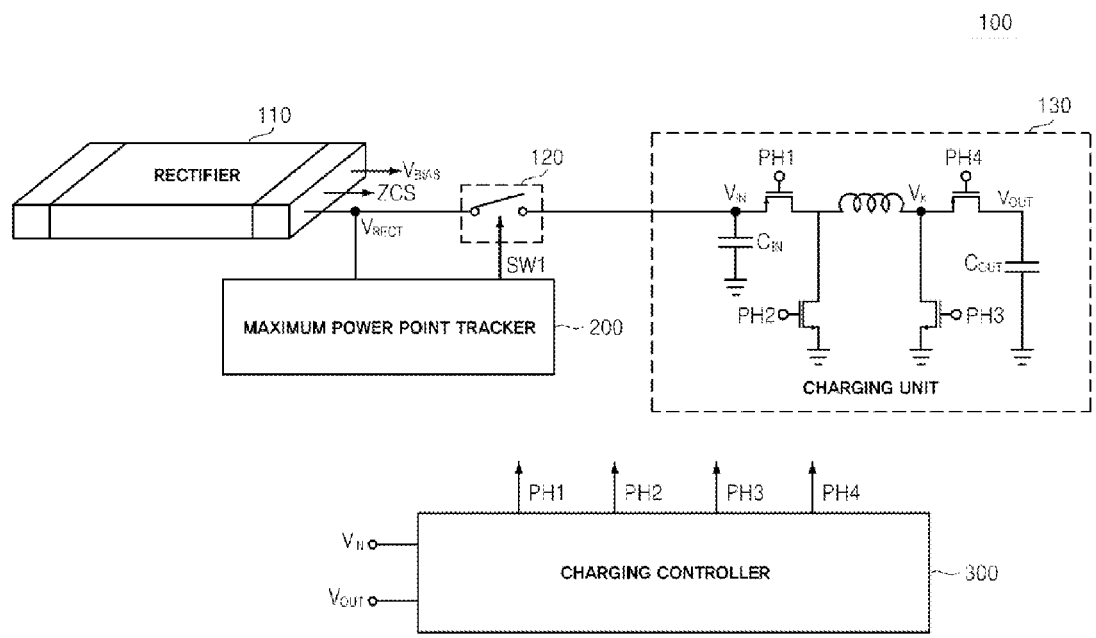
FIG. 1 is a schematic block diagram of an energy harvesting apparatus according to an embodiment of the present invention.

As the invention allows for various changes and numerous embodiments, particular embodiments will be illustrated in the drawings and described in detail in the written description. However, this is not intended to limit the present invention to particular modes of practice, and it is to be appreciated that all changes, equivalents, and substitutes that do not depart from the spirit and technical scope of the present invention are encompassed in the present invention. In the drawings, like reference numerals refer to like elements throughout.

The terms such as "first", "second", "A", "B", etc. are used herein merely to describe a variety of constituent elements, but the constituent elements are not limited by the terms. The terms are used only for the purpose of distinguishing one constituent element from another constituent element. For example, a first element may be termed a second element and a second element may be termed a first element without departing from the teachings of the present invention. As used herein, the term "and/or" includes any and all combinations of one or more of the associated listed items.

It will be understood that when an element, such as a layer, a region, or a substrate, is referred to as being "on", "connected to" or "coupled to" another element, it may be directly on, connected or coupled to the other element or intervening elements may be present. In contrast, when an element is referred to as being "directly on," "directly connected to" or "directly coupled to" another element or layer, there are no intervening elements or layers present.

The terminology used herein is for the purpose of describing particular embodiments only and is not intended to be limiting of example embodiments. As used herein, the singular forms "a," "an" and "the" are intended to include the plural forms as well, unless the context clearly indicates otherwise. It will be further understood that the terms "comprises" or "has" used herein specify the presence of stated features, integers, steps, operations, members, components, and/or groups thereof, but do not preclude the presence or addition of one or more other features, integers, steps, operations, members, components, and/or groups thereof.

Unless otherwise defined, all terms including technical and scientific terms used herein have the same meaning as commonly understood by one of ordinary skill in the art to which this invention belongs. It will be further understood that terms, such as those defined in commonly used dictionaries, should be interpreted as having a meaning that is consistent with their meaning in the context of the relevant art and will not be interpreted in an idealized or overly formal sense unless expressly so defined herein.

Reference will now be made in detail to the exemplary embodiments of the present invention with reference to the accompanying drawings. Throughout this specification and claims, when a certain part "includes", "comprises", or "has" a certain component, this indicates that the part may further include another component instead of excluding another component unless there is no different disclosure.

FIG. 1 is a schematic block diagram of an energy harvesting apparatus 100 according to an embodiment of the present invention. Referring to FIG. 1, the energy harvesting apparatus 100 according to an embodiment of the present invention includes a rectifier 110, a first switch 120, a charging unit 130, a maximum power point tracker 200, and a charging controller 300. The rectifier 110 rectifies an alternating current (AC) voltage applied from an energy source into a direct current (DC) voltage. To this end, the rectifier 110 receives energy from the energy source (e.g. a piezoelectric transducer, a vibration device, etc.).

The first switch 120 is on/off according to a control signal SW1 output from the maximum power point tracker 200 to control connection between the rectifier 110 and the charging unit 130.

The charging unit 130 is connected to the rectifier 110 through the first switch 120 and charges the rectifier 110 with an output voltage.

The maximum power point tracker 200 tracks a maximum power point of an output voltage of the rectifier 110. That is, the maximum power point tracker 200 finds a voltage when the output voltage of the rectifier 110 is highest. To this end, the maximum power point tracker 200 is selectively connected between the rectifier 110 and the charging unit 130, differentiates an output voltage $V_{RECT}$ of the rectifier 110 in a first connection state, and controls the output voltage $V_{RECT}$ of the rectifier 110 based on the differentiation result. In this case, the first connection state refers to a state in which the first switch 120 is opened to disconnect the rectifier 110 and the charging unit 130 from each other and the maximum power point tracker 200 is connected to the rectifier 110 by a switch in the maximum power point tracker 200. The configuration and detailed operation of the maximum power point tracker 200 for this will described in more detail with reference to FIGS. 2 to 5.

The charging controller 300 compares the output voltage of the rectifier 110 and the maximum power point voltage tracked by the maximum power point tracker 200 and controls an operation of the charging unit 130 based on the comparison result. For example, when the rectified voltage is lower than the maximum power point voltage as the comparison result, charging is temporally stopped so as to increase the rectified voltage, and in an opposite case, charging is continuously performed so as to reduce the rectified voltage. To this end, the charging controller 300 outputs control signals PH1, PH2 PH3, and PH4 for controlling on/off of transistors that function as switches in the charging unit 130. The configuration and detailed operation of the charging controller 300 will described in more detail with reference to FIGS. 6 and 7.

Figure 2:
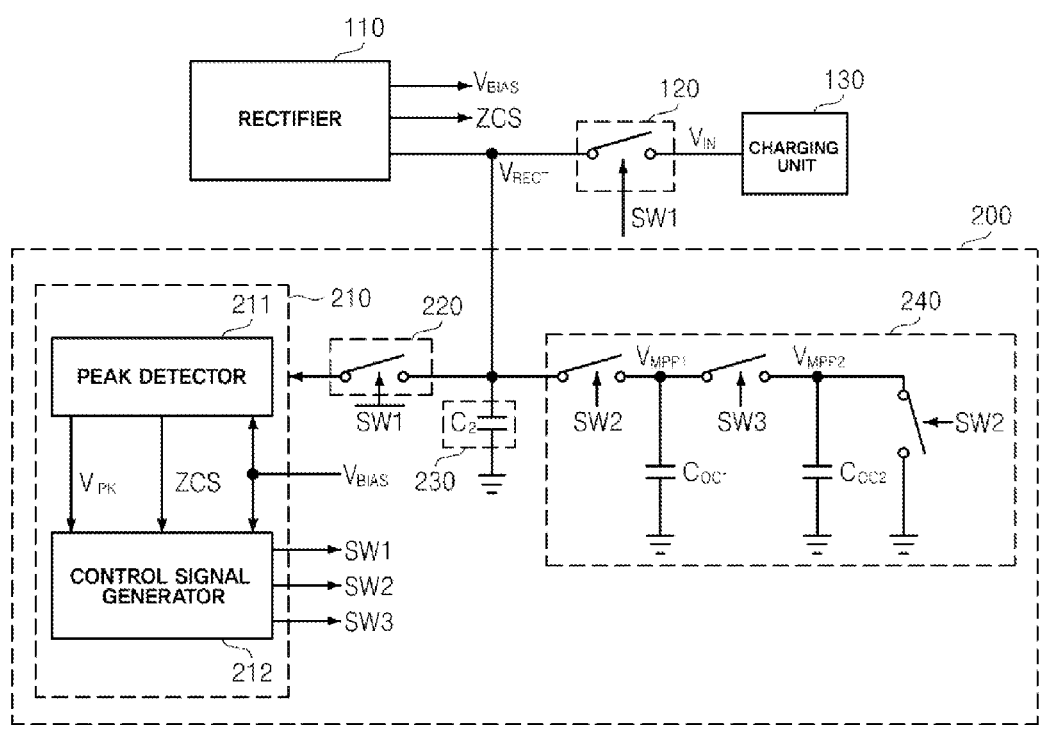
FIG. 2 is a schematic circuit diagram for explanation of an operation of a maximum power point tracker illustrated in FIG. 1.

FIG. 2 is a schematic circuit diagram for explanation of an operation of the maximum power point tracker 200 illustrated in FIG. 1. Referring to FIG. 2, the maximum power point tracker 200 includes a voltage controller 210, a second switch 220, a first capacitor $C_2$ 230, and a charge sharer 240.

Figure 3:
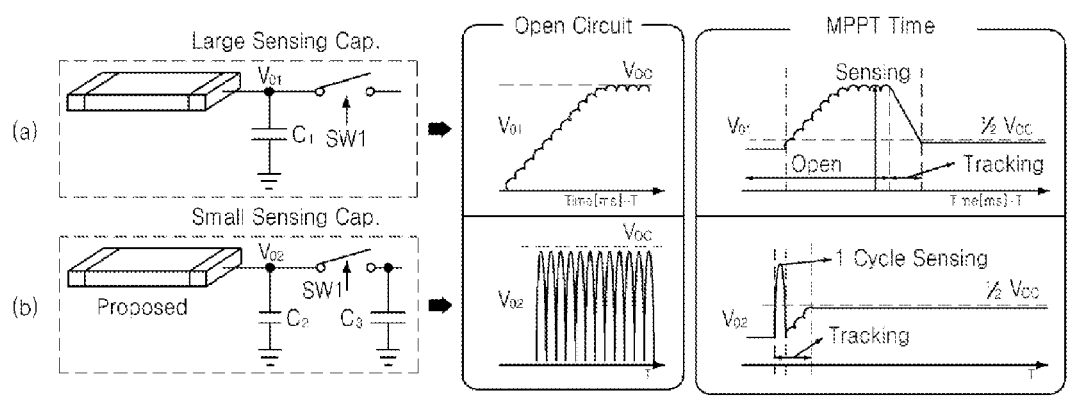
FIG. 3 is a diagram for explanation of comparison of the operating characteristics of a first capacitor illustrated in FIG. 2 with a conventional case.

The first capacitor $C_2$ 230 is connected to an output node of the rectifier 110 and charges the output voltage $V_{RECT}$ of the rectifier 110. In this case, the first capacitor $C_2$ 230 may have capacitance with a nano unit. That is, the first capacitor $C_2$ 230 may have lower capacitance and size than generally used capacitors with a micro unit. This is because, when a small capacitor is used, the rectifier output voltage $V_{RECT}$ exhibits high ripple and a maximum power point is reached in one cycle. FIG. 3 is a diagram for explanation of comparison of the operating characteristics of the first capacitor $C_2$ 230 with a conventional case. FIG. 3(a) illustrates a conventional case in which a maximum power point Voc is tracked using a general capacitor $C_1$ with a micro unit, and FIG. 3(b) illustrates a case according to the present invention in which a maximum power point Voc is tracked using a small capacitor $C_2$ with a nano unit. As seen from FIG. 3, when a maximum power point is tracked using the small capacitor $C_2$ with a nano unit according to the present invention, time to sense and track a maximum power point is much shorter than in the conventional case. Like such, according to the present invention, a smaller capacitor than the conventional case may be applied so as to rapidly measure a voltage value corresponding to the maximum power point.

The voltage controller 210 is selectively connected to the first capacitor $C_2$ 230. That is, the voltage controller 210 is selectively connected to the first capacitor $C_2$ 230 by the second switch 220, and on/off of the second switch 220 is controlled according to a reversal signal/SW1 of the control signal SW1 for controlling on/off of the first switch 120. Thus, the second switch 220 operates oppositely to the first switch 120 and connects the voltage controller 210 to the first capacitor $C_2$ 230 when the first switch 120 is turned off to disconnect the rectifier 110 and the charging unit 130 from each other.

Likewise, when the voltage controller 210 is connected to the first capacitor $C_2$ 230, the voltage controller 210 differentiates a voltage of the first capacitor $C_2$ 230, detects the maximum power point based on the differentiation result, and then outputs a control signal corresponding to the detection result. To this end, the voltage controller 210 may include a peak detector 211 for differentiating the voltage of the first capacitor $C_2$ 230 to output the differentiation result, and a control signal generator 212 for generating the control signal based on the output signal of the peak detector 211.

Figure 4:
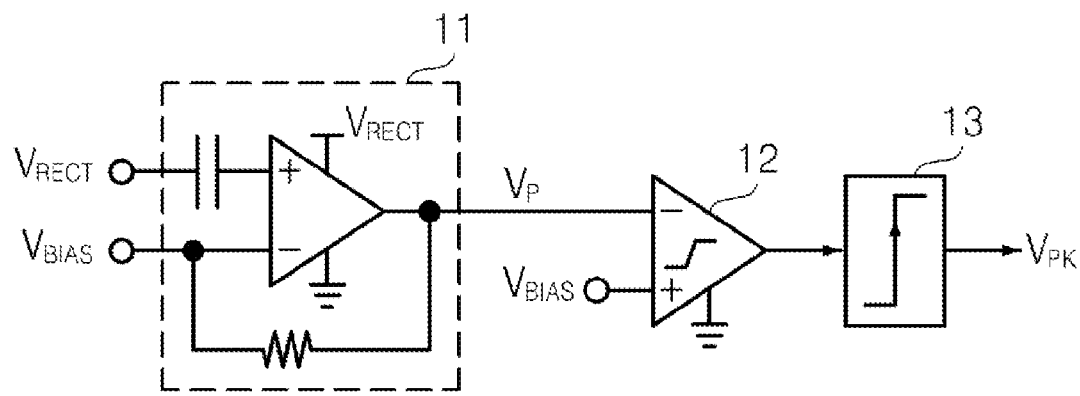
FIG. 4 is a diagram for explanation of the configuration and operating characteristics of a peak detector illustrated in FIG. 2.
Figure 4:
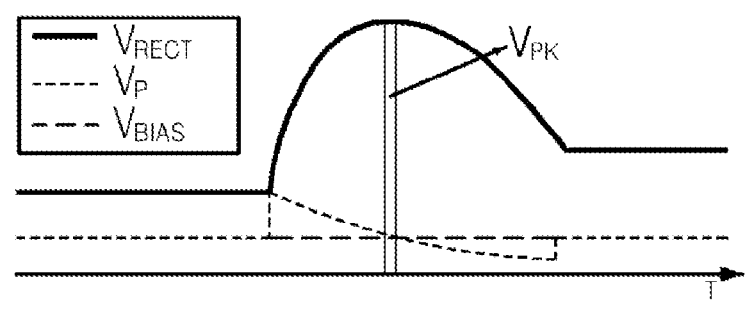

In this case, as illustrated in FIG. 4, the peak detector 211 includes a differentiator 11, a comparer 12, and a rising edge detector 13. As such, the differentiator 11 is applied to the peak detector 211. This is because, since an output voltage of the rectifier 110 exhibits high ripple and a peak value of the output voltage is highest in the energy harvesting apparatus 100, it is difficult to detect the peak value by a general peak detector. An operation of the peak detector 211 will now be described with reference to FIG. 4. Referring to FIG. 4(a), first, the differentiator 11 receives a bias voltage $V_{BIAS}$ and an output voltage $V_{RECT}$ of the rectifier 110 and differentiates the output voltage $V_{RECT}$ of the rectifier 110. Then the comparer 12 compares the bias voltage $V_{BIAS}$ with a output voltage Vp of the differentiator 11. In this regard, when the output voltage $V_{RECT}$ of the rectifier 110 reaches the maximum power point Voc, the output voltage Vp of the differentiator 11 becomes smaller than the bias voltage $V_{BIAS}$. In this case, the comparer 12 and the rising edge detector 13 output a signal $V_{PK}$. FIG. 4(b) illustrates characteristic curves of voltages in the peak detector 211. As seen from FIG. 4(b), when the output voltage $V_{RECT}$ of the rectifier 110 indicates the peak value $V_{PK}$, the output voltage Vp of the differentiator 11 becomes smaller than the bias voltage $V_{BIAS}$.

The control signal generator 212 outputs switch control signals SW1, SW2, and SW3 for controlling a plurality of switches included in the first switch 120, the second switch 220, and the charge sharer 240. Among these, the control signal SW1 is used to periodically open the first switch 120 during one cycle. In addition, the control signal generator 212 generates the control signals SW2 and SW3 in response to the signal $V_{PK}$ output from the peak detector 211 and transmits the control signals SW2 and SW3 to the charge sharer 240.

The charge sharer 240 includes second and third capacitors $C_{OC1}$ and $C_{OC2}$ for sharing and storing the maximum power point voltage and a plurality of switches for controlling paths of the second and third capacitors $C_{OC1}$ and $C_{OC2}$, and distributes the output voltage $V_{RECT}$ of the rectifier 110 to the plural capacitors $C_{OC1}$ and $C_{OC2}$ based on the control signals SW2 and SW3 output from the voltage controller 210.

Figure 5:
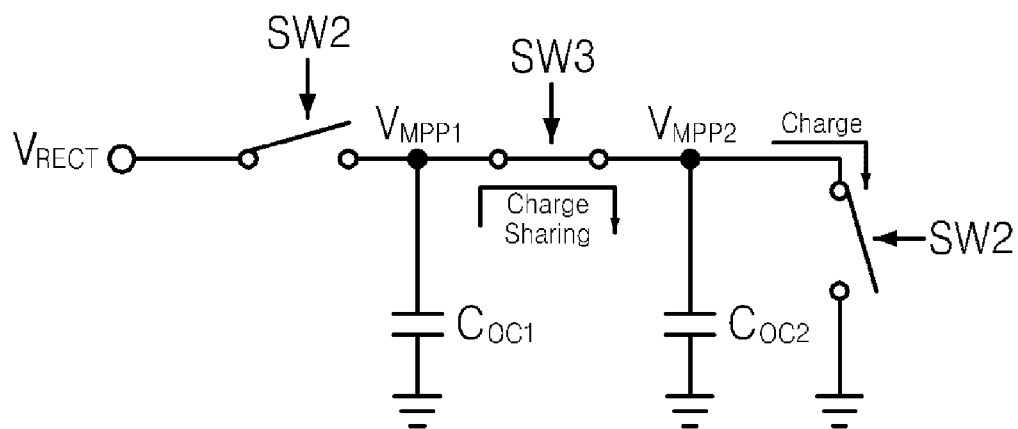
FIG. 5 is a diagram for explanation of the operating characteristics of a charging sharer illustrated in FIG. 2.
Figure 5:
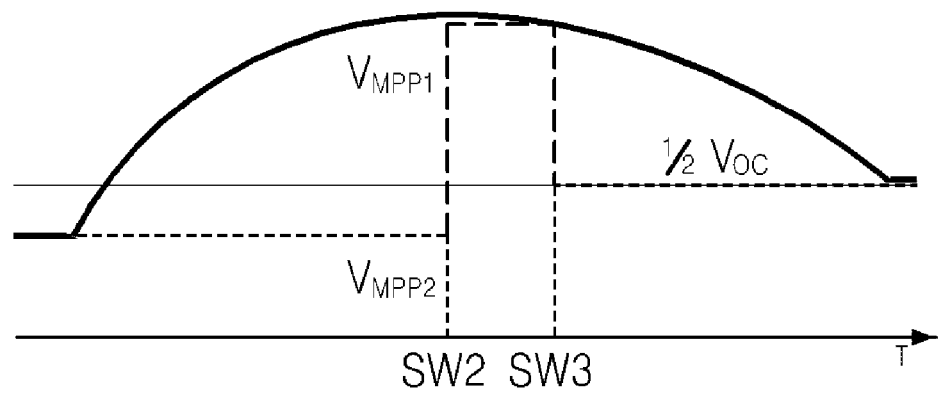

First, when the control signal generator 212 outputs a control signal SW2 in a high level in response to the signal $V_{PK}$ output when the maximum power point voltage Voc is detected, the maximum power point voltage Voc stored in the first capacitor $C_2$ 230 is copied to the second capacitor $C_{OC1}$ and the third capacitor $C_{OC2}$ is discharged in order to prevent cumulative charging. As such, when the maximum power point voltage Voc is copied to the second capacitor $C_{OC1}$, the control signal generator 212 outputs the control signal SW3 in a high level to close a switch connected between the second capacitor $C_{OC1}$ and the third capacitor $C_{OC2}$, and thus charge sharing is performed to store half of the maximum power point voltage Voc in the second capacitor $C_{OC1}$ and the third capacitor $C_{OC2}$. FIG. 5 is a diagram for explanation of the operating characteristics of a charging sharer. FIG. 5(a) illustrates a process of charge sharing according to the control signal SW3 and FIG. 5(b) illustrates characteristic curves of a process for acquisition of a value of ½ Voc in response to the control signals SW2 and SW3 that are sequentially output when the maximum power point voltage Voc is detected.

Figure 6:
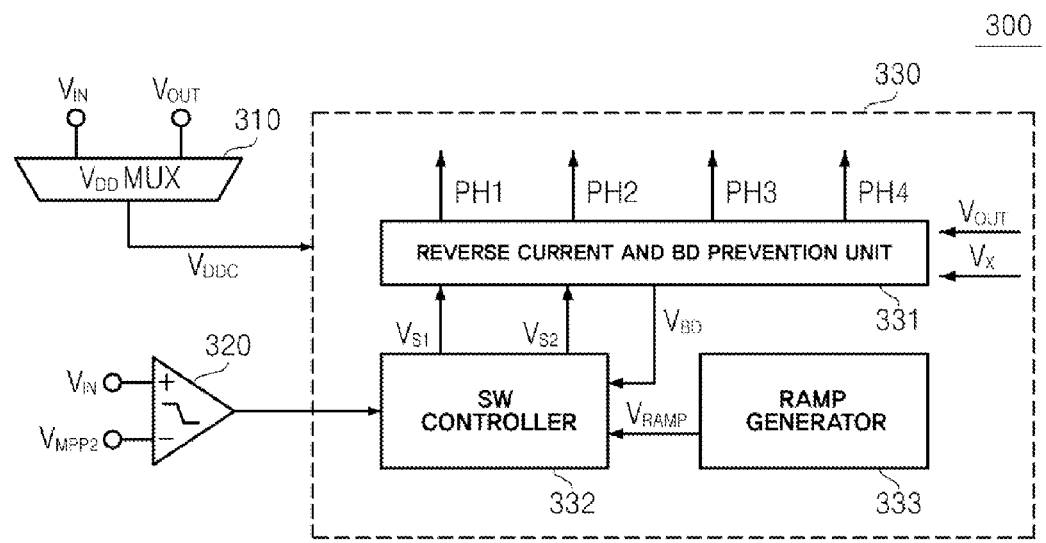
FIG. 6 is a schematic block diagram of a charging controller illustrated in FIG. 1.

FIG. 6 is a schematic block diagram of the charging controller 300 illustrated in FIG. 1. Referring to FIG. 6, the charging controller 300 includes a voltage multiplexer ($V_{DD}$ MUX) 310, a comparer 320, and a buck-boost controller 330, and the buck-boost controller 330 includes a reverse current and diode body effect prevention unit 331, a SW controller 332, and a ramp generator 333. These components are system control blocks and self-powered blocks using input/output voltages of a DC-DC converter. In order to supply high power to the self-powered blocks, the voltage multiplexer ($V_{DD}$ MUX) 310 is applied, and an example of a configuration thereof is illustrated in FIG. 7.

Figure 7:
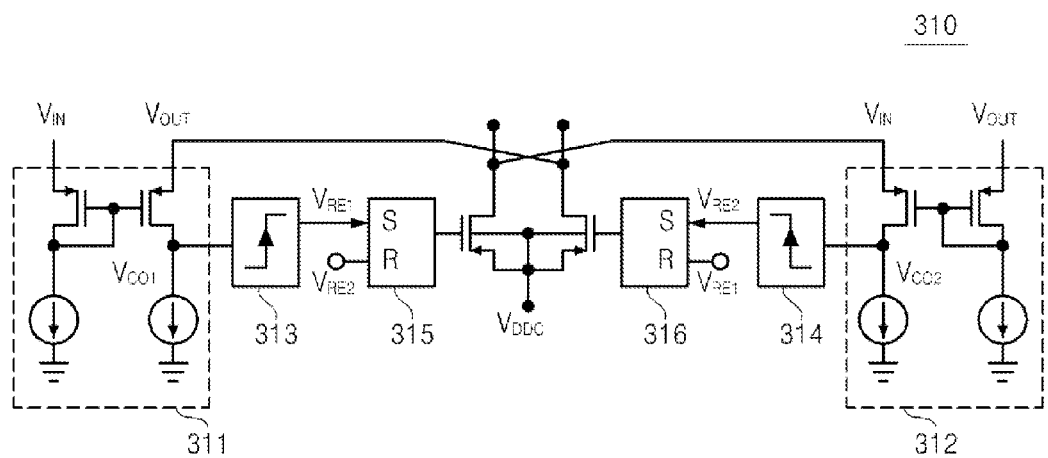
FIG. 7 is a diagram for explanation of the configuration and operating characteristics of a voltage multiplexer illustrated in FIG. 6.

FIG. 7 is a diagram for explanation of the configuration and operating characteristics of the voltage multiplexer ($V_{DD}$ MUX) 310 illustrated in FIG. 6. Referring to FIG. 7, the voltage multiplexer ($V_{DD}$ MUX) 310 includes a plurality of comparers 311 and 312, a plurality of rising edge detectors 313 and 314, and a plurality of SR latches 315 and 316.

In general, the comparers 311 and 312 consume low energy but delay a comparison result. The delay of comparer output causes a rapid rising of voltages when a general multiplexer (MUX) is used. That is, when output values of the comparers 311 and 312 are changed to 0 from 1, long delay occurs. In this regard, all switches of output terminals are closed and thus a normal voltage cannot be output for delay time when large and small sizes of two compared voltages are reversed. Accordingly, the rising edge detectors 313 and 314 may remove the rapidly rising voltage, and the SR latches 315 and 316 may rapidly open and close a switch of an output unit without delay time in that delay time is not long occurs when the output values of the comparers 311 and 312 are changed to 1 from 0.

Figure 8:
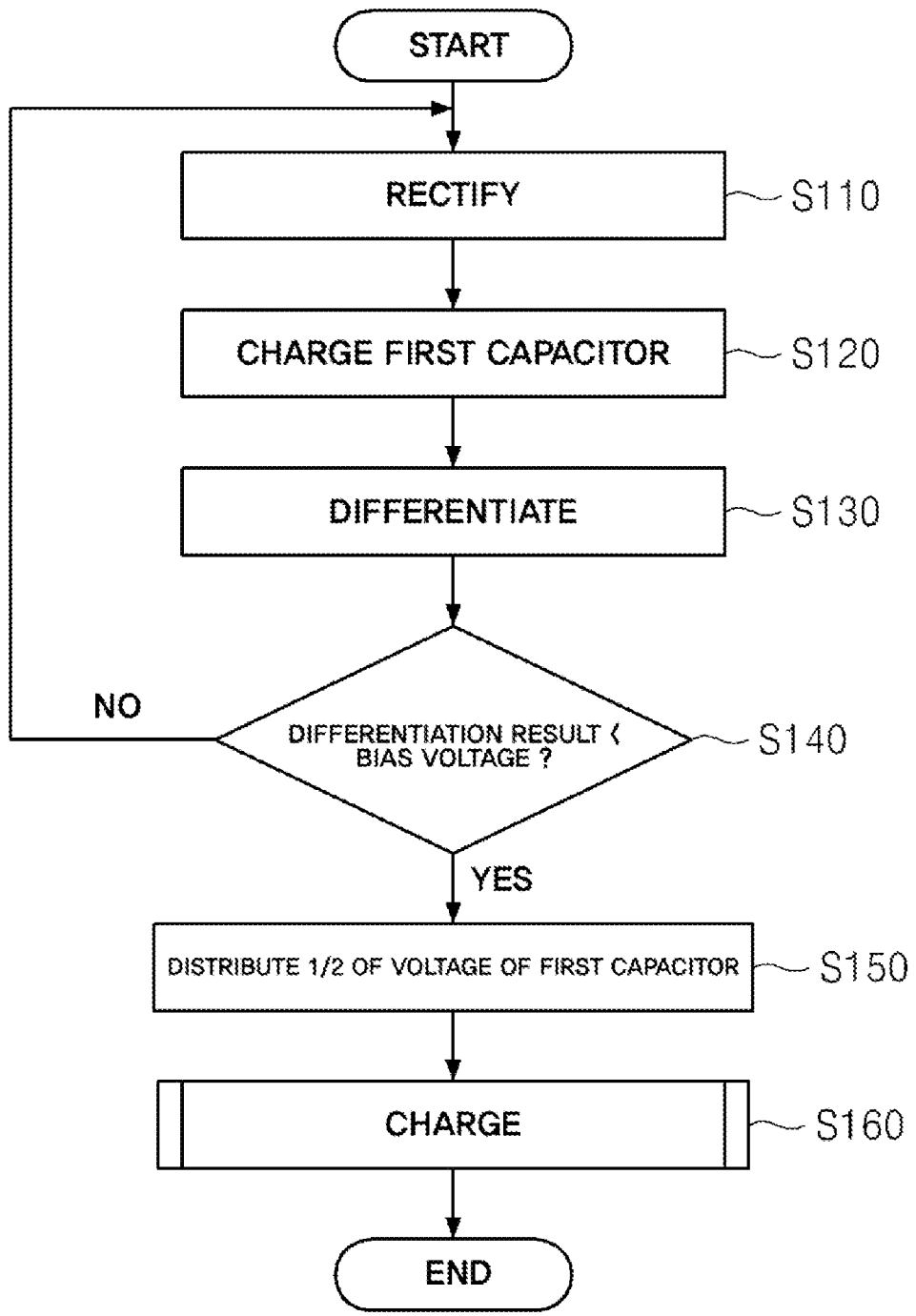
FIGS. 8 and 9 are schematic flowcharts of an energy harvesting method according to an embodiment of the present invention.
Figure 9:
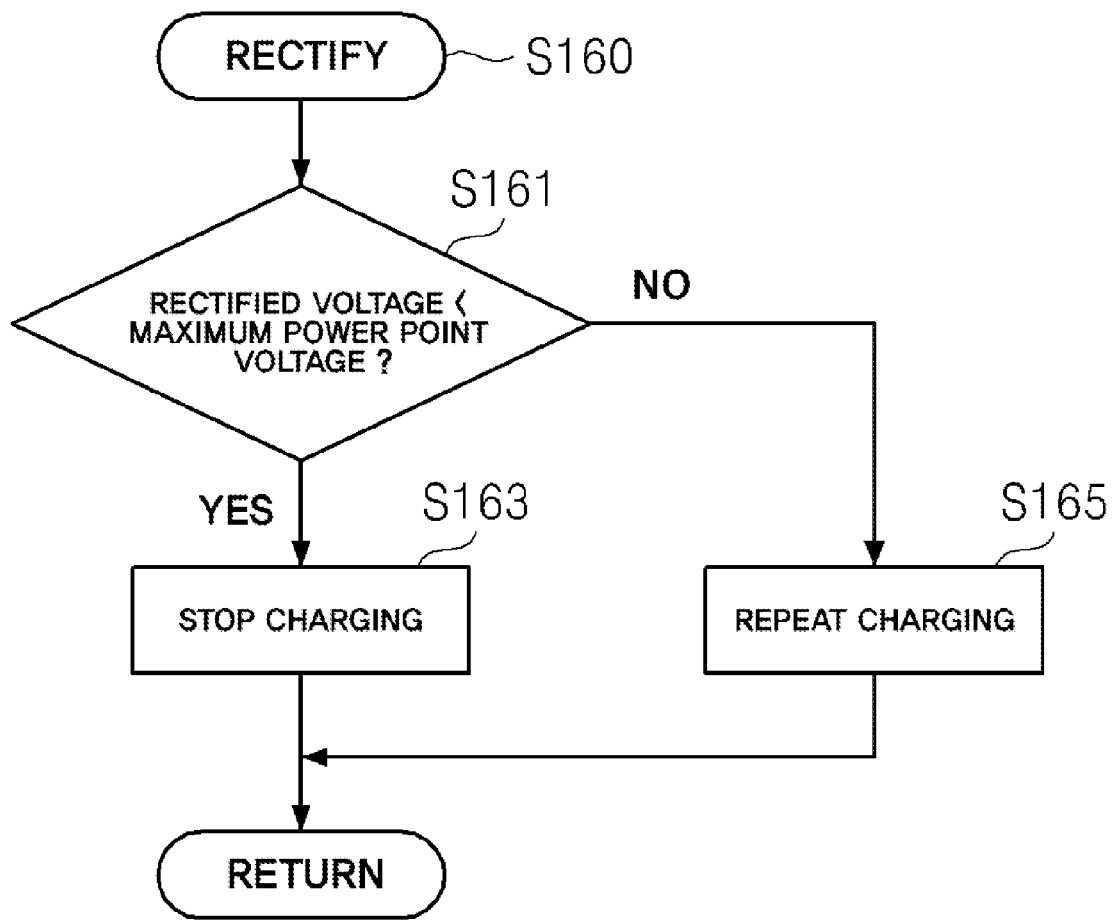

FIGS. 8 and 9 are schematic flowcharts of an energy harvesting method according to an embodiment of the present invention. FIG. 8 is a schematic flowchart of an energy harvesting method according to an embodiment of the present invention and FIG. 9 is a schematic flowchart of a charging process of FIG. 8.

With reference to FIGS. 2 and 8, the energy harvesting method according to an embodiment of the present invention will be described below.

First, in operation S110, the rectifier 110 rectifies an alternating current (AC) voltage supplied from an energy source to a direct current (DC) voltage. To this end, the rectifier 110 may receive energy from the energy source (e.g. a piezoelectric transducer, a vibration device, etc.).

In operation S120, the first capacitor $C_2$ 230 is charged with the voltage rectified in operation S110. In this case, the first capacitor $C_2$ 230 may have capacitance in a nano unit.

In operation S130, the peak detector 211 differentiates the voltage charged in the first capacitor $C_2$ 230, that is, the voltage rectified in operation S110.

In operation S140, the peak detector 211 detects a maximum power point voltage based on the differentiation result value. That is, the peak detector 211 compares the differentiation result value with a bias voltage and detects a voltage charged in the first capacitor $C_2$ 230 as the maximum power point voltage at a time point when the differentiation result value becomes lower than the bias voltage.

In operation S140, when the maximum power point voltage is detected, and in operation S150, the charge sharer 240 distributes the voltage discharged in the first capacitor $C_2$ 230 to the second and third capacitors $C_{OC1}$ and $C_{OC2}$ according to charge sharing. As a result, ½ of the maximum power point voltage is stored in the second and third capacitors $C_{OC1}$ and $C_{OC2}$.

In operation S160, the charging unit 130 performs charging while maintaining the maximum power point voltage.

Referring to FIGS. 1 and 9, in order to perform operation S160, first, in operation S161, the charging controller 300 compares the rectified voltage (i.e. the output voltage of the rectifier 110) with the maximum power point voltage.

In operation S163, as the comparison result of operation S161, when the rectified voltage (i.e. the output voltage of the rectifier 110) is lower than the maximum power point voltage, the charging controller 300 temporarily stops charging in order to enhance the rectified voltage (i.e. the output voltage of the rectifier 110).

In operation S165, as the comparison result of operation S161, when the rectified voltage (i.e. the output voltage of the rectifier 110) is higher than the maximum power point voltage, the charging controller 300 continuously performs charging in order to lower the rectified voltage (i.e. the output voltage of the rectifier 110).

Figure 10:
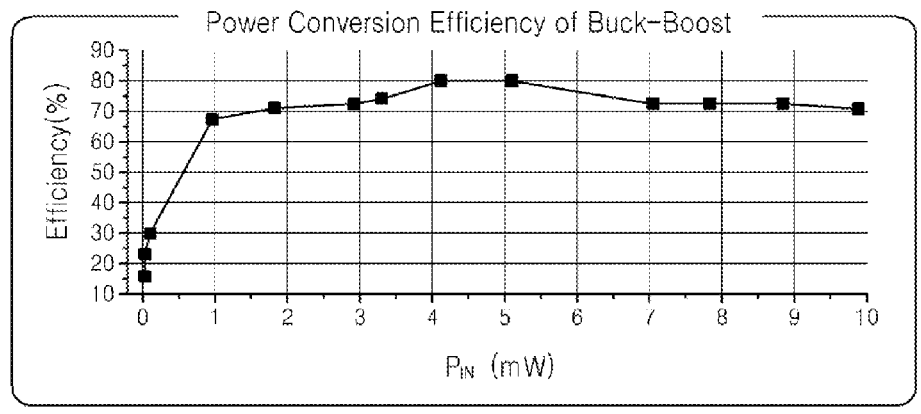
FIG. 10 is a diagram for explanation of operating performance of an energy harvesting according to an embodiment of the present invention.

FIG. 10 is a diagram for explanation of operating performance of an energy harvesting according to an embodiment of the present invention. FIG. 10(a) illustrates a result obtained by measuring power conversion efficiency of the buck-boost controller 330 of FIG. 6 and FIG. 10(b) illustrates a comparison table between the present invention and another piezoelectric energy harvesting system.

Referring to FIG. 10(a), the power conversion efficiency of the buck-boost controller 330 is 80% (with $V_{IN}$=4.7V and load resistance of 7 k) including controller energy consumption and has a maximum of 99.9%. Referring to FIG. 10(b), comparison results between conventional harvesting systems (ISSCC 2013 and TPEL 2012) and the present invention (this work) may be seen, and in particular, it may be seen that maximum power point tracking time (MPPT Time) is 800 ms (21.5 V to 11.5 V) in the case of ISSCC 2013 and is 47 s (17 V to 11 V) in the case of TPEL 2012, whereas maximum power point tracking time (MPPT Time) is 20 ms (3.4V to 1.2V) in the case of the present invention (this work) which means that tracking is very fast compared with other systems.

The embodiments of the present invention may be written as computer programs and can be implemented in general-use digital computers that execute the programs using a computer readable recording medium.

Examples of the computer readable recording medium include magnetic storage media (e.g., ROMs, floppy disks, hard disks, etc.) and optical recording media (e.g., CD-ROMs, or DVDs).

According to the present invention, a peak detector using a differentiator may be applied, and thus an open-circuit voltage may be measured without additionally applying an external voltage and a voltage value corresponding to a maximum power point may be rapidly measured using the open-circuit voltage. Accordingly, the present invention may minimize power loss and may be applied to an energy harvesting system with high variability of power harvested by a harvester. In addition, the present invention is advantageous to have high conversion efficiency while rapidly handling an external environment.

The present invention has been particularly shown and described with reference to exemplary embodiments thereof.

It will be understood by those of ordinary skill in the art that various changes in form and details may be made therein without departing from the spirit and scope of the present invention as defined by the following claims.

What is claimed is:

1. An energy harvesting apparatus comprising:
   a rectifier rectifying an alternating current (AC) voltage supplied from an energy source into a direct current (DC) voltage;
   a charging unit storing an output voltage of the rectifier;
   a maximum power point tracker selectively connected between the rectifier and the charging unit, for differentiating the output voltage of the rectifier in a first connection state, and for controlling the output voltage of the rectifier based on the differentiation result of the output voltage of the rectifier,
   wherein the maximum power point tracker comprises:
   a first capacitor connected to an output node of the rectifier;
   a voltage controller selectively connected to the first capacitor, for differentiating a voltage of the first capacitor, for detecting a maximum power point based on the differentiation result of the first capacitor, and for outputting a control signal corresponding to a detection result; and
   a charge sharer storing a voltage of the output node of the rectifier based on the control signal and distributing the stored voltage as a maximum power point voltage;
   a charging controller comparing the output voltage of the rectifier and the maximum power point voltage and controlling an operation of the charging unit based on a comparison result; and
   a voltage multiplexer (MUX) supplying power to the charging controller, wherein the voltage multiplexer (MUX) comprises an S-R latch and a rising edge detector and prevents delay of output of the voltage multiplexer (MUX).

2. The energy harvesting apparatus according to claim 1, wherein the first capacitor has capacitance with a nano unit.

3. The energy harvesting apparatus according to claim 1, wherein the voltage controller comprises:
   a peak detector for differentiating the voltage of the first capacitor and outputting the differentiation result of the voltage of the first capacitor; and
   a control signal generator for generating the control signal based on an output signal of the peak detector.

* * * * *